United States Patent [19]
Hutchens et al.

[11] Patent Number: 5,535,986
[45] Date of Patent: Jul. 16, 1996

[54] TORSIONALLLY LOADED FLUID SEALS FOR ROTARY VALVES

[75] Inventors: Wilbur D. Hutchens; Timothy A. McMahon, both of Marshalltown, Iowa; Brian V. Nolan, Mason, Ohio; Steven M. Kirk, Cincinnati, Ohio; Paul R. Hunsberger, Jr., Mason, Ohio

[73] Assignee: Fisher Controls International, Inc., Clayton, Mo.

[21] Appl. No.: 491,360

[22] Filed: Jun. 30, 1995

[51] Int. Cl.$^6$ .................................. F16K 1/226
[52] U.S. Cl. ........................ 251/306; 251/171
[58] Field of Search ................ 251/171, 173, 251/306, 307

[56] References Cited

U.S. PATENT DOCUMENTS

| | | | |
|---|---|---|---|
| 3,642,248 | 2/1972 | Benware | 251/172 |
| 3,986,699 | 10/1976 | Wucik, Jr. et al. | 251/173 |
| 4,113,268 | 9/1978 | Simmons et al. | 277/168 |
| 4,293,116 | 10/1981 | Huriels | 251/306 X |
| 4,306,706 | 12/1981 | Olansen et al. | 251/306 |
| 4,418,889 | 12/1983 | Krause | 251/306 |
| 4,744,572 | 5/1988 | Sahba et al. | 277/236 |
| 5,388,806 | 2/1995 | Kusmer et al. | 251/306 |

OTHER PUBLICATIONS

Xomox Corporation, *Brochure*, "Xomox, Pliaxseal® high performance butterfly valves", Dec./1994.
Posi–Seal International, Inc., *Brochure*, "Posi–Seal®, Novex™, High–Performance Butterfly Valves", Feb./1989.
Posi–Seal International, Inc., *Brochure*, "Posi–Seal® Phoenix III™ Fire Safe High Performance Butterfly Valves.", 1984.
Fisher Controls International, Inc., *Data Sheet BD050*, "Posi–Seal Model A31A, High–Performance Butterfly Valve", May 1992.
Fisher Controls International, Inc., *Instruction Manual*, Form 5291, "Model A31A High–Performance Butterfly Valve", Aug. 1992.
Fisher Controls International, Inc., *Instruction Manual*, Form 5288, "Type 8532 High–Performance Butterfly Valve", Feb. 1992.
Fisher Controls International, Inc., *Bulletin 51.6:8532*, "Type 8532 High–Performance Butterfly Valve", Sep. 1991.
Fisher Controls International, Inc., *Instruction Manual*, Form 5343, "Type 8560 Eccentric Disk Control Valves", Mar. 1994.

*Primary Examiner*—John C. Fox
*Attorney, Agent, or Firm*—Marshall, O'Toole, Gerstein, Murray & Borun

[57] ABSTRACT

A fluid seal for rotary valves wherein a metal seal ring is adapted to fit within a groove formed within the valve body and a retainer ring for sealing engagement with the sealing surface of a closure member. The metal seal ring has a non-symmetrical cross section with the retainer ring side portion including a shoulder engaging the retainer within the groove and a seating portion extending from the groove for sealing engagement with the closure member. A valve body side portion of the metal seal ring includes a shoulder engaging the valve body within the groove and a non-seating portion extending from the groove for a substantially non-sealing and non-engagement with the sealing surface of the closure member. Engagement of the closure member with the seating portion of the retainer side portion of the metal seal ring torsionally loads the cross-section of the seal ring so as to only enlarge the retainer side portion. A resilient material seal ring can be added to the metal seal ring for desired applications. If the resilient material ring is destroyed by high temperatures or fire, the seating portion of the metal seal ring continues to reliably engage the closure member. An elastomeric O-ring can be used on the metal seal ring on a side opposite to the resilient material ring.

10 Claims, 2 Drawing Sheets ns
TORSIONALLLY LOADED FLUID SEALS FOR ROTARY VALVES

This invention relates to fluid seals and more particularly to seal rings for rotary type fluid control valves.

BACKGROUND OF THE INVENTION

Fluid control valves such as butterfly type valves, are utilized extensively in petroleum processing and pipeline systems. In such systems, the normal high operating reliability requirement of the fluid seal, i.e. positive shutoff and low breakaway (opening) torque is compounded by the further requirement that the seal continue to operate satisfactorily in fire conditions involving high temperatures and high pressures.

In Simmons, et al., U.S. Pat. No. 4,113,268, there is provided a fire proof, bubble-tight sealing mechanism which utilizes a two-stage arrangement. A soft primary seal, for example of Teflon, is inserted in the rib of a metal seal ring for contact with the complimentary surface of a closure member. The Teflon material, extending radially inward beyond the metal rib, provides a bubble-tight seal under normal conditions. In the event of fire, the Teflon is destroyed. Subsequently, the metal rib of the seal ring dynamically moves into position to form a secondary or metal to metal seal.

While the Simmons, et al. invention was a major advance in the art, which provided an unprecedented quality of sealing and fire safety in a butterfly valve, certain drawbacks nevertheless exist. The primary seal necessitates the machining of a metal and the insertion of a soft material into the metal rib of the seal ring, the insertion thereof which is a relatively difficult and expensive manufacturing procedure.

Benware in U.S. Pat. No. 3,642,248, discloses a valve sealing mechanism wherein the seal ring is fitted within a circumferential groove of a valve body member. A portion of the seal ring extends out of the groove, radially inward, for making engagement with a closure member or disc. The seal ring is arranged within the groove for movable adjustment in response to the pressure of the system.

The seal ring of Benware, in a preferred embodiment, has a backing ring which is held within a groove, beneath the seal ring. This backing ring provides a pre-loaded sealing force for the sidesealing of the seal ring within the walls of the groove.

The seal ring of Benware is preferably constructed of a soft material such as Teflon. However, a second embodiment discloses a metal seal ring. In the latter, a pair of inclined surfaces at the sides of the steel ring abuts the lateral sides of the groove and are pre-loaded by being of a slightly greater dimension than the width of the groove. The front of the seal ring is curved slightly and concavely in relation to the disc surface. This causes the upstream and downstream edges of the seating surface of the seal ring to bite against the disc surface when the seal ring is pushed against the disc.

This metal seal ring of Benware has proved unsatisfactory. Although the seal ring is constructed of metal for fire safe performance, the metal to metal contact does not provide the desired quality and reliability of sealing for the desired use of such valves. Sahba, et al., in U.S. Pat. No. 4,744,572 discloses a metal seal ring which is an improvement of the metal seal ring disclosed in Benware, U.S. Pat. No. 3,642,248. In Sahba, U.S. Pat. No. 4,744,572, there is provided a seal ring positioned within a groove circumferential with respect to the passageway of the valve. A convex seating portion of the seal ring extends through an annular opening in the groove, for sealing engagement with a closure member. Shoulder portions, which extend from the sides of the seating portion, abut the side walls of the groove. The seal ring is compressed in width within the groove, so that a resilient side-sealing force is imparted to the contact of the shoulder portions with the side walls of the groove.

While the metal seal ring of Sahba, et al. has proved commercially successful, it is desired to improve the quality and reliability of such sealing mechanisms.

Other seal mechanisms as shown in Wucik, Jr., et al. U.S. Pat. No. 3,986,699, include a metal valve seat insert ring having an inner thin-walled skirt-like lip for making pre-loaded sealing contact with a valve disc. The edge of the lip engages a mating circumferential sealing surface of a valve disc, at a location downstream from the plane of maximum disc diameter, with an interference fit to provide a pre-loaded radial sealing force between the edge of the lip and the sealing surface of the disc. The annular lip forms the downstream side of an undercut groove for a resilient seal ring that provides a primary seal, and the engagement of the lip edge with the sealing surface of the valve member provides a metal-to-metal backup seal in the event of damage to or destruction of the resilient seal ring.

It is desired to provide an improved seal for rotary type fluid control valves which eliminates the problems of prior seals, provides a reliable and positive shutoff seal on closing, and requires a small breakaway torque for opening the valve.

It is also desired to provide a reliable seal for rotary valves which can be reliably used in bi-directional flow applications.

It is further desired to provide a valve which can meet fire-test specifications and which can maintain a positive fluid shutoff condition even when high temperatures and fires may have reduced the effectiveness or destroyed any Teflon or other resilient material sealing rings. In particular it is desired to provide a valve which meets the fire-test requirements in both flow directions.

SUMMARY OF THE INVENTION

In accordance with the principles of the present invention, there is provided an improved fluid seal for rotary type valves, such as butterfly valves wherein a metal seal ring is adapted to fit within a groove formed within the valve body and a retainer ring for sealing engagement with the sealing surface of a valve closure member. The metal seal ring can be readily placed into the groove and the retainer ring mounted on the valve body during assembly. No special tools or cumbersome and timely assembly procedures are required to insert the metal seal ring into the groove in the valve body.

Moving the valve closure member sealing surface into interference engaging contact with the seal ring only enlarges one side of the seal ring to thereby provide torsional loading of the cross-section of the seal ring. This allows greater flexibility for the seal to accommodate the drift or movement of the closure member when the shutoff changes in fluid pressure forces the closure member into or away from the seal.

In the preferred embodiment of the invention, the metal seal ring includes a valve body side portion engaging the valve body within the groove and a retainer ring side portion engaging the retainer ring within the groove. The metal seal ring has a non-symmetrical cross-section formed by the valve body side portion and the retainer ring side portion.

The retainer ring side portion includes a shoulder engaging the retainer ring within the groove and a seating portion extending from the groove for sealing engagement with the sealing surface of the closure member. The valve body side portion includes a shoulder engaging the valve body within the groove and a non-seating portion extending from the groove for substantially non-sealing and non-engagement with the sealing surface of the closure member. The closure member substantially only engages the seating portion of the retainer ring side portion for torsionally loading the cross-section of the seal ring.

Torsionally loading the cross-section of the metal seal ring enables a greater flexibility to be obtained for the seal so as to thereby accommodate the drift of the closure member when the change in fluid pressure during shutoff forces the closure member into or away from the seal. Other advantages are also obtained in that the seal ring wear is reduced because of the torsional loading of the seal cross-section. That is, lower seating forces are required when closing the valve because only one side of the metal seal has to be engaged and enlarged, whereas prior art metal seal rings required both seal sides to be engaged and expanded. That is, in the preferred embodiment of the invention, the closure member substantially only engages the retainer ring side portion for torsionally loading the cross-section of the seal, whereas the valve body side portion of the seal ring is essentially not engaged. Torsional loading of the metal seal ring also enables the seal ring to operate within the elastic range of the seal material.

The configuration of the valve body side and the retainer body side of the seal ring can be reversed so that only the valve body side contacts the closure member, if desired. In such a reversed case only the valve body portion of the seal ring expands significantly. The non-symmetrical seal ring with closure member contact only on the valve body portion again provides the desired torsionally loaded seal ring cross-section.

In one embodiment of the invention, an all metal-to-metal sealing mechanism is provided by the previously described metal seal ring and the metal closure member. Because of the all metal seal mechanism, the seal of the present invention provides a fire-tested operation with reliable shutoff on closing and low torque opening requirements, i.e., low breakaway torque.

The principles of the present invention also can be applied to a valve incorporating a resilient seal material. In another embodiment of the invention, a metal seal ring is constructed of similar components as previously. In particular, the metal seal ring includes a non-symmetrical cross-section formed by a valve body side portion and a retainer ring side portion. The metal seal ring is adapted to accommodate and trap a resilient material insert such as Teflon between the valve body side portion and the retainer ring side portion for sealingly engaging the sealing surface of a closure member. The opposite side of the metal seal ring is adapted to accommodate a backup O-ring. During assembly, the resilient material insert ring is inserted into the front of the metal seal ring and the backup O-ring is placed around the back of the metal seal ring. The entire two-part ring is then inserted into a groove formed within the valve body such that there is slight touching but no compression of the O-ring within the groove. Compression of the O-ring takes place when the retainer ring is mounted to the valve body to maintain the metal seal ring, resilient material ring, and O-ring within the groove.

Closing of the valve by rotating the closure member enables the sealing surface of the closure member to substantially only engage the seating portion of the retainer ring side portion so that the cross section of the seal ring is torsionally loaded. Torsional loading of the metal seal cross section provides the advantages as previously described.

In addition, in an embodiment of the invention employing a resilient material seal, the torsionally loaded seal ring cross-section enables the metal portion of the seal to stay in contact with the closure member even after any fire has destroyed the resilient material insert ring. A fire-tested valve is therefore provided with a torsionally loaded metal seal ring in accordance with the invention.

In comparison to prior art metal seal rings with resilient materials having two metal-to-metal contact lines with the closure member, in the present invention, the single metal-to-metal contact line along with the torsionally loaded seal ring cross-section prevents a spiral leak path that may occur in the fire seal when the fire seal is twisted due to the closing action of the closure member.

A further significant advantage of the present invention is enabling the improved seal ring to be used in rotary fluid control valves in bi-directional flow applications. Therefore, the present invention provides a positive shutoff with low breakaway (opening) torque for reliable bi-directional use. In addition, the torsionally loaded seals of the present invention can be readily manufactured and assembled when compared to prior art seals.

BRIEF DESCRIPTION OF THE DRAWINGS

The features of this invention which are believed to be novel are set forth with particularity in the appended claims. The invention may be best understood by reference to the following description taken in conjunction with the accompanying drawings, in which like reference numerals identify like elements in the several figures and in which:

DETAILED DESCRIPTION

The improved sealing mechanism of the present invention is especially advantageous for use with rotary fluid control valves, such as butterfly valves or trunnion valves. The intended purpose of a seal mechanism for such fluid control valves is to prevent leakage of fluid when the valve closure member is in a closed or shutoff position. At the same time, it is desired to enable the valve closure member to be opened with a minimum of force (known as "breakaway torque") while not diminishing the shutoff or valve closing efficiency of the seal mechanism.

Although the present description of the invention is with respect to a butterfly valve, it is to be understood that the principles may be applied to any type of rotary valve wherein it is desired to have reliable shutoff with a low breakaway torque. The improved seal mechanism of this invention also meets various fire rating requirements for fluid control valves.

Figure 1:
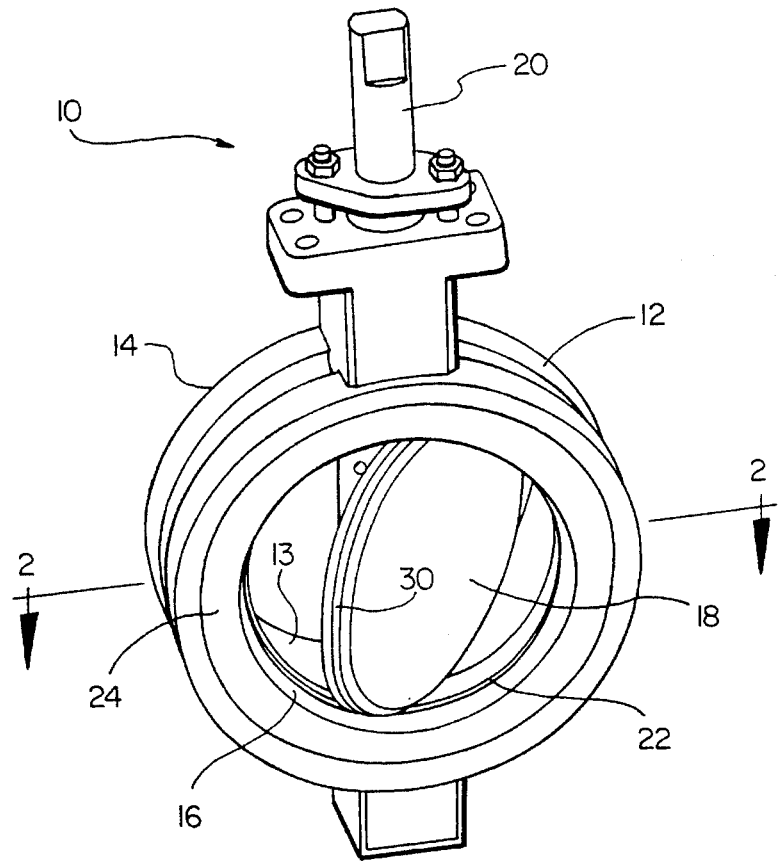
FIG. 1 is a schematic perspective view of a rotary type fluid control valve in accordance with the present invention.
Figure 2:
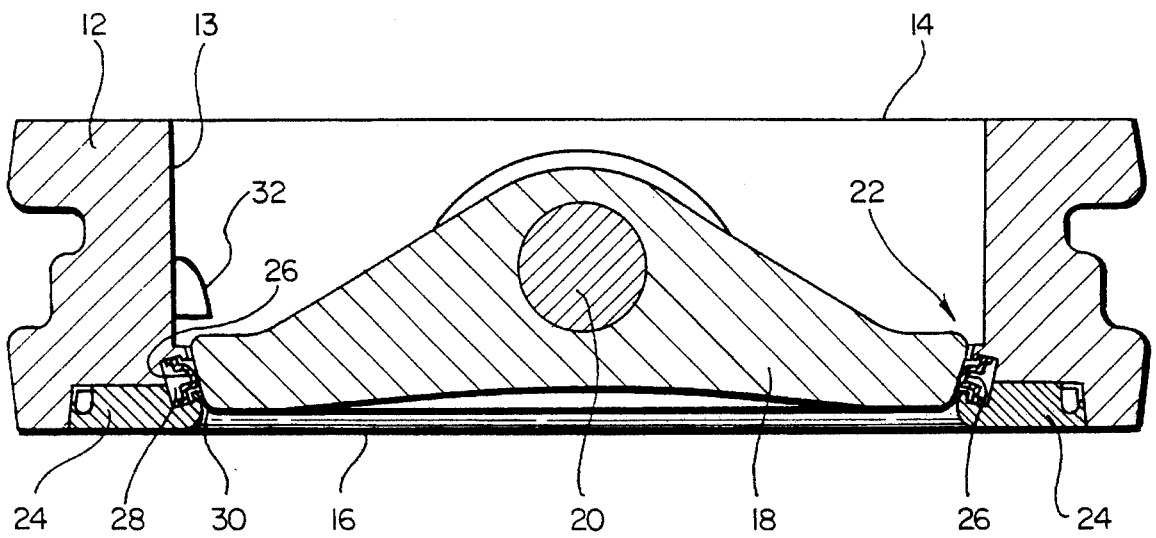
FIG. 2 is a cross-sectional view taken along section lines 2—2 of FIG. 1 illustrating the closure member and metal seal ring in accordance with one embodiment of the present invention.
Figure 3:
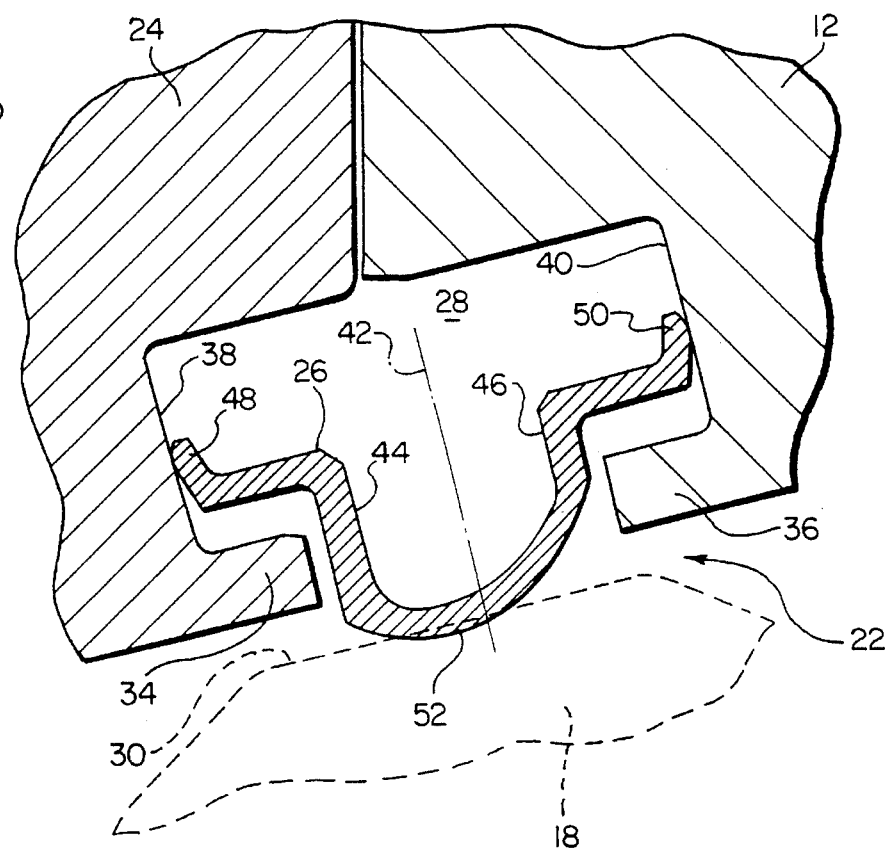
FIG. 3 is an enlarged view of the seal of FIG. 2 illustrating a metal seal ring according to the invention torsionally loaded within a groove formed between the valve body and the retainer.
Figure 4:
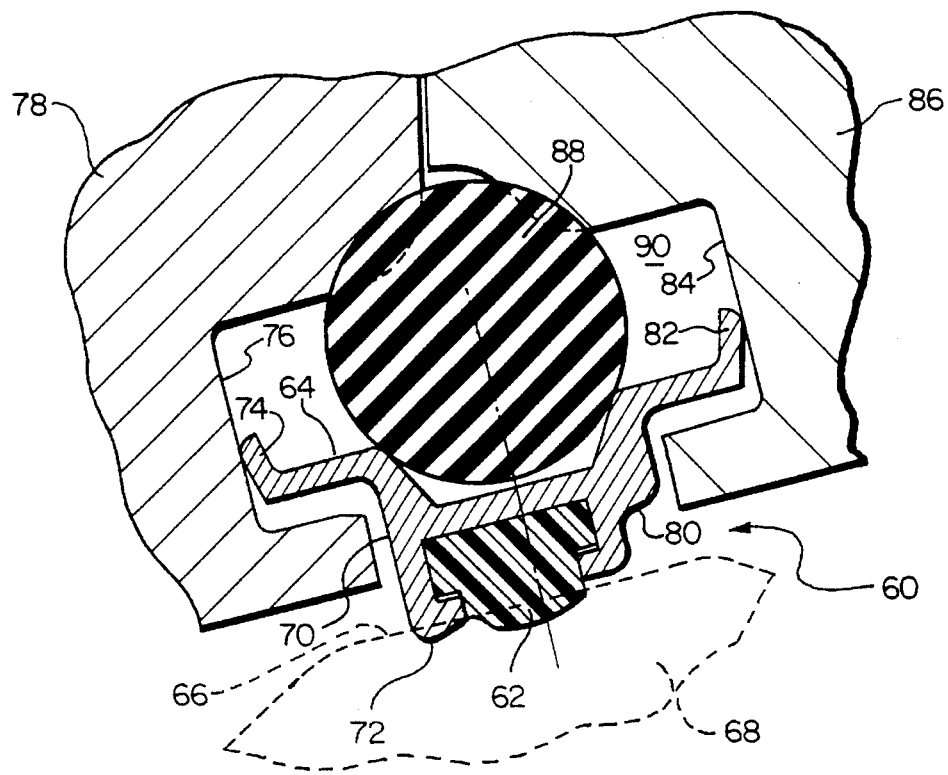
FIG. 4 is an enlarged view similar to FIG. 3 illustrating an alternative embodiment of the invention with a torsionally loaded metal ring and a resilient material insert ring.

Reference now may be made to the drawings wherein FIGS. 1–3 illustrate a butterfly valve incorporating the improved seal mechanism of the present invention in a metal seal ring providing all metal-to-metal contact with the valve closure member. FIG. 4 will thereafter be described with respect to a metal seal ring incorporating a resilient material ring such as Teflon in an alternative embodiment of the invention.

Turning now to FIGS. 1–3 there is illustrated a butterfly valve 10 which includes a valve body 12 having a fluid passageway 13 with an inlet 14 and an outlet 16. Fluid flow from the inlet 14 to the outlet 16 is controlled by a rotatable closure member or disc 18 which in turn is connected through suitable pins to a rotatable valve shaft 20 for fluid sealing contact of the closure member 18 with a seal mechanism 22.

The outlet side 16 of the valve body 12 is counterbored with an annular recess for flush mounting a retainer ring 24 by means of machine screws or by press fitting as shown in FIG. 2. The retainer ring 24 serves to hold the seal mechanism 22 within the valve body 12 as is shown more clearly in FIG. 2.

With reference to FIG. 2, the retainer 24 serves to hold a metal seal ring 26 within a circumferential groove 28 and within the valve body 12. Seal mechanism 22 includes the seal ring 26 for sealing contact with a circumferential sealing surface 30 of the closure member 18.

As shown in FIG. 2, the valve closure member or disc 18 with the circumferential sealing surface 30 is adapted to be mounted within passageway 13 for rotation about a diametrical axis between an open position in which the valve disc is substantially parallel to the axis of passageway 13 and a shutoff position in which the valve disc is substantially perpendicular to the passageway axis and sealing surface 30 makes interference mating contact with the seal ring 26 as illustrated in FIG. 2. A stop 32 ensures that the closure member 18 only opens in one rotary direction. With respect to FIG. 2, it can be seen that the stop 32 ensures the valve may be opened only by rotating the closure member 18 in the counter-clockwise direction.

FIG. 3 is an enlarged view of the seal mechanism 22 showing the seal ring 26 within the groove 28 formed within the valve body 12 and the retainer 24, with the closure member 18 in phantom, it is to be understood that the closure member 18 illustrated in FIG. 3 in dashed lines is shown in phantom to merely show the shutoff position of the closure member with respect to the seal ring 26 upon contact therewith. That is, the seal ring 26 will be moved within the groove 28 by such contact with the closure member 18, and the final position of the seal ring 26 is not illustrated.

The mouth of the groove 28 is defined by a pair of lip flanges 34, 36 extending from the groove side walls 38, 40 respectively. A center reference line 42 divides the distance between the ends of lips 34, 36 and also provides a reference for dividing the seal ring 26 into two non-symmetrical segments, i.e., a retainer side portion 44 and a body side portion 46 between the respective shoulders 48, 50. Accordingly, the seal ring retainer side portion 44 extends from the center reference line 42 to the shoulder portion 48 which engages the groove side wall 38 on the retainer 24. Similarly, the seal ring valve body side portion extends from the center reference line 42 to the shoulder portion 50 which engages the groove sidewall 40 on the valve body 12. The seal ring 26 therefore can be seen to be non-symmetrical about the center reference line 42.

It is to be understood that the illustration of FIG. 3 shows the seal ring 26 in its free position, i.e., after having been placed within groove 28, but without any contact with the sealing surface 30 of the closure member 18. Thus, the seal ring 26 can be seen to have a seating portion 52 which extends beyond the lips 34, 36 and therefore outside of the groove 28. When the closure member 18 is rotated into the position shown in FIG. 3, so that the circumferential sealing surface 30 engages the ring seating portion 52, the interference contact engagement occurs on the retainer side of reference line 42 because of the non-symmetrical configuration of the seal ring 26 thereby torsionally loading the cross-section of the seal ring.

It may be noted that there is a longer moment arm (a) between the engagement point of ring seating portion 52/sealing surface 30 and the engagement of shoulder portion 50 with groove sidewall 40 on the body ring side, as compared to similar contact points on the retainer ring side, i.e., (b) between seating portion 52/sealing surface 30 and shoulder portion 48 engaging the groove retainer sidewall 38. Thus, moment arm (a) is greater than moment arm (b). This results in the seal ring 26 tending to pivot about the engagement point of the shoulder portion 50 with body sidewall 40 due to the torsional loading. In addition, this torsional loading of the seal ring 26 substantially only enlarges the seal ring retainer side portion 44 while essentially not enlarging at all the seal ring body side portion 46.

Significant advantages are afforded by the torsionally loaded seal of the present invention. In particular, the torsionally loaded seal ring cross-section allows greater flexibility for the seal to accommodate the drift or movement of the closure member when any fluid changes in pressure during shutoff forces the closure member into or away from the seal. The seal wear is also reduced because of the torsional loading of the seal cross-section since only one seal side is engaged. Furthermore, torsional loading of the seal allows the seal to operate within the elastic range of the seal material.

It is preferred that the seal ring 26 be formed of metal, such as, stainless steel (316) or high strength stainless steels.

In assembling the seal ring 26 into the valve, initially with the retainer 24 removed from the valve body 12, the seal ring 26 is inserted into the groove 28 with the shoulder portion 50 engaging the valve body sidewall 40. The retainer 24 is then mounted onto the valve body 12 and the seal ring assumes the free position shown in FIG. 3.

It is to be understood that the configuration of the seal ring 26 could be reversed so that the body side portion 46 could be configured to make contact with the sealing surface 30 and whereas the retainer side portion 44 does not contact the sealing surface. In such an alternative embodiment, torsional loading of the seal ring would still occur, except in this instance the longer moment arm would be on the retainer side of center reference line 42 so that the seal to disc interference would only enlarge the body side portion of the seal ring.

FIG. 4 illustrates another alternative embodiment of a torsionally loaded seal mechanism 60 which includes a resilient material seal ring 62 such as Teflon captured within a metal seal ring 64. Similar to seal ring 26, the metal seal ring 64 includes two non-symmetrical half sections one of which contacts a sealing surface 66 of a rotating closure member 68. In particular, a retainer side portion 70 includes a seating portion 72 for contacting the sealing surface 66 and a shoulder portion 74 for contacting a retainer sidewall 76 of a seal retainer 78. The other non-symmetrical sealing portion 80 does not contact the sealing surface 66 and includes a shoulder portion 82 for engaging a sidewall 84 of a valve body 86. Seal ring 64 may be formed of the same metal as the seal ring 26. However, it is preferred to form seal ring 26 of high strength stainless steels.

As in FIG. 3, it is to be understood that the closure member 68 illustrated in dashed lines is in phantom only to show the eventual shutoff position of the closure member with respect to the seal ring 64. Accordingly, it is to be understood that the seal ring 64 is shown in the free position before any torsional loading from interference engagement with the closure member 68.

During assembly, the ring 64 with attached resilient material ring 62 and an elastomeric O-ring 88 is placed within a groove 90 in the valve body with the retainer 78 being dismounted from the valve body 86. It is to be understood that the seal mechanism 60 when placed in the groove 90 would be in the free position shown in FIG. 4, except that there would be no overlap of a portion of the valve body 86 and the O-ring as shown in dashed lines for convenience. That is, the O-ring 88 would simply rest against the dashed line segments of the valve body 86 shown in FIG. 4.

Subsequently, with mounting of the seal retainer 78 onto the valve body 86, the shoulder portion 74, 82 would engage the sidewalls as shown in FIG. 4, and there would be an interference of the O-ring 88 with the retainer 78 and the valve body 86 as is illustrated in the dashed lines at the top of the O-ring in FIG. 4. It is further to be understood of course that there is no torsional loading of the seal ring 64 in the initial insertion into the groove 90 and the mounting of retainer 78 onto the valve body 86. However, subsequently when the closure member 68 is rotated to a shutoff position with the sealing surface 66 engaging the seating portion 72 of the seal ring 64, then the cross-section of the seal ring 64 is torsionally loaded. As can be seen in FIG. 4, the sealing surface 66 only engages in an interference with the retainer side portion 70 of the seal ring 64 so that only the retainer side 70 is enlarged.

All of the advantages previously described with respect to having provided a torsionally loaded seal ring cross-section are obtained for the seal mechanism 60 shown in FIG. 4. In addition, the seal mechanism 60 can be used in bi-directional flow applications. Furthermore, if fire has destroyed the resilient material seal 62, the metal portion of the seal, namely seating portion 72, remains in contact with the sealing surface 66 of the closure member 68. Also, as with the seal ring 26, in seal ring 64, the configuration of the retainer side portion 70 and the body side portion 80 could be reversed so that only the body side portion engages the closure member and the desired torsionally loaded seal ring cross-section would still be attained.

The valve of the present invention successfully meets all of the desired characteristics previously indicated as desirable. In testing prototypes utilizing the present invention compared to currently available seals a torque reduction of 20% was obtained. Also, increased cycle lives were experienced. The seal of FIG. 4 exhibited improved bidirectional shutoff capability after cycle testing. The seal of FIG. 3 exhibited improved shutoff capability after cycle testing. A significant advantage of the seal of FIG. 4 is that it has been tested and meets the fire-test requirements in both flow directions.

The foregoing detailed description has been given for clearness of understanding only, and no unnecessary limitations should be understood therefrom, as modifications will be obvious to those skilled in the art.

We claim:

1. In a fluid seal for rotary valves wherein a metal seal ring is adapted to fit within a groove formed with the valve body and a retainer ring for sealing engagement with the sealing surface of a closure member, the metal seal ring having a valve body side portion engaging the valve body within the groove and a retainer ring side portion engaging the retainer ring within the groove, the improvement of a torsionally loaded metal seal ring comprising:

the metal seal ring having a non-symmetrical cross section formed by the valve body side portion and the retainer ring side portion;

the retainer ring side portion includes a shoulder engaging the retainer ring within the groove and a seating portion extending from the groove for sealing engagement with the sealing surface of the closure member;

the valve body side portion includes a shoulder engaging the valve body within the groove and a non-seating portion extending from the groove for substantially non-sealing and non-engagement with the sealing surface of the closure member; and wherein the closure member substantially only engages the seating portion of the retainer ring side portion for torsionally loading the cross-section of the seal ring.

2. A fluid seal according to claim 1, including a reference center axis midway between said shoulders defining the retainer ring side portion on one side and the valve body side portion on the other side thereof, wherein the closure member forms contact engagement with the seal ring on the retaining ring side portion only.

3. A fluid seal according to claim 2, wherein a moment arm between said contact engagement and the valve body shoulder engaging the valve body within the groove is greater than a moment arm between said contact engagement and the retainer ring side shoulder engaging the retainer within the groove.

4. A fluid seal according to claim 3, wherein upon engagement of the seal ring with the closure member only the retainer ring side enlarges.

5. A fluid seal according to claim 1, including a resilient material insert mounted within the seal ring for sealingly engaging the closure member sealing surface.

6. A fluid seal according to claim 5, including an O-ring mounted on the seal ring opposite the resilient material insert for engagement with the valve body within the groove.

7. A fluid seal according to claim 6, wherein the O-ring engages the retainer ring within the groove.

8. In a fluid seal for rotary valves wherein a metal seal ring is adapted to fit within a groove formed with the valve body and a retainer ring for sealing engagement with the sealing surface of a closure member, the metal seal ring having a valve body side portion engaging the valve body within the groove and a retainer ring side portion engaging the retainer ring within the groove, the improvement of a torsionally loaded metal seal ring comprising:

the metal seal ring having a non-symmetrical cross section formed by the valve body side portion and the retainer ring side portion;

the retainer ring side portion includes a shoulder engaging the retainer ring within the groove and a projecting portion extending from the groove;

the valve body side portion includes a shoulder engaging the valve body within the groove and a projecting portion extending from the groove; and wherein the closure member substantially only engages the projecting portion of one of the retainer ring side portion and the valve body portion for torsionally loading the cross-section of the seal ring.

9. In a fire-tested valve, including a valve body, a valve closure member movable between open and closed positions for controlling fluid flow through the valve body, the valve closure member having a sealing surface, a metal seal ring mounted within a valve body groove for sealing engagement with the sealing surface of the closure member, and a retainer ring mounted on the valve body for maintaining the seal ring within the groove, the improvement of a torsionally loaded metal seal ring comprising:

the metal seal ring having a non-symmetrical cross section formed by the valve body side portion and the retainer ring side portion;

the retainer ring side portion includes a shoulder engaging the retainer ring within the groove and a projecting portion extending from the groove;

the valve body side portion includes a shoulder engaging the valve body within the groove and a projecting portion extending from the groove; and wherein the closure member substantially only engages the projecting portion of one of the retainer ring side portion and the valve body portion for torsionally loading the cross-section of the seal ring.

10. A fire-tested valve according to claim 9, wherein said improved seal ring includes a resilient material insert ring mounted within the metal seal ring for sealingly engaging the sealing surface of the closure member.

* * * * *